(12) United States Patent
Agrawal et al.

(10) Patent No.: US 12,081,431 B1
(45) Date of Patent: Sep. 3, 2024

(54) MONITORING AND ORCHESTRATING STITCHED VPN SERVICES ACROSS MULTIPLE DOMAINS

(71) Applicant: Ciena Corporation, Hanover, MD (US)

(72) Inventors: Sharad Agrawal, Pune (IN); Vaibhav Lohani, Pune (IN); Roopesh Palasdeokar, Pune (IN); Avadhut Atre, Pune (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/327,800

(22) Filed: Jun. 1, 2023

(30) Foreign Application Priority Data

Apr. 19, 2023 (IN) .............................. 202311028580

(51) Int. Cl.
*H04L 45/24* (2022.01)
*H04L 12/46* (2006.01)
*H04L 45/42* (2022.01)

(52) U.S. Cl.
CPC .......... *H04L 45/24* (2013.01); *H04L 12/4641* (2013.01); *H04L 45/42* (2013.01)

(58) Field of Classification Search
CPC ...... H04L 45/24; H04L 45/42; H04L 12/4641
See application file for complete search history.

(56) References Cited

U.S. PATENT DOCUMENTS

| | | | |
|---|---|---|---|
| 7,519,010 B1* | 4/2009 | Aggarwal | H04L 12/18 370/254 |
| 8,422,502 B1 | 4/2013 | Alaettinoglu et al. | |
| 9,026,674 B1 | 5/2015 | Kanna et al. | |
| 10,554,549 B1* | 2/2020 | Basavarajappa | H04L 69/325 |
| 10,999,195 B1* | 5/2021 | Suryanarayana | H04L 45/64 |
| 11,575,541 B1* | 2/2023 | Styszynski | H04L 12/4633 |
| 2006/0182122 A1* | 8/2006 | Davie | H04L 12/2854 370/395.53 |
| 2013/0031271 A1* | 1/2013 | Bosch | H04W 84/042 709/245 |
| 2020/0127913 A1* | 4/2020 | Filsfils | H04L 45/04 |
| 2020/0213182 A1* | 7/2020 | Hugar | H04L 45/026 |
| 2021/0273827 A1* | 9/2021 | Vairavakkalai | H04L 12/4633 |

* cited by examiner

*Primary Examiner* — Blake J Rubin
(74) *Attorney, Agent, or Firm* — Baratta Law PLLC; Lawrence A. Baratta, Jr.

(57) ABSTRACT

Systems and methods are described herein for monitoring and orchestrating an autonomous system. A process, according to one implementation, includes a step of monitoring an autonomous system that spans across multiple domains. The process also includes obtaining one or more ingress endpoints associated with Virtual Private Network (VPN) traffic used for conducting one or more VPN services through the autonomous system. Also, the process includes the step of obtaining one or more egress endpoints associated with the VPN traffic, wherein the one or more ingress endpoints and the one or more egress endpoints are located in the multiple domains. The process further includes using the one or more ingress endpoints and the one or more egress endpoints to compute one or more end-to-end VPN traffic paths through the autonomous system.

19 Claims, 6 Drawing Sheets

MONITORING AND ORCHESTRATING STITCHED VPN SERVICES ACROSS MULTIPLE DOMAINS

TECHNICAL FIELD

The present disclosure generally relates to networking systems and methods. More particularly, the present disclosure relates to provisioning an autonomous system to include stitched Virtual Private Network (VPN) services over a Service Provider Network (SPN) and one or more Data Centers (DCs) and enabling end-to-end monitoring and orchestrating of the autonomous system.

BACKGROUND

Generally, a Network Management System (NMS) is configured to monitor a single domain within a communication network. For example, to optimize the quality of services offered on the communication network, the NMS may perform functions to optimize data routes from a network device at one end of the domain to another network device at the other end. The optimization, for example, may include analyzing data traffic to determine an efficient way to utilize nodes and links throughout the domain.

In another environment associated with communication networks, traditional Virtual Private Network (VPN) systems provide VPN services that can be monitored within a particular domain. VPN technology has advanced to a point where a company can have multiple offices set up in multiple locations and where VPN services are allowed to be routed through multiple domains. For example, VPN services can span from a first domain configured as a Service Provider Network (SPN) using Internet Protocol VPN (IPVPN) to a second domain configured as a Data Center (DC) using Ethernet VPN (EVPN).

However, an NMS is typically only configured to monitor one domain at a time. A network administrator may be required to manually monitor domains individually, which can be complex and time-consuming as a network expands. Therefore, since VPN services spanning an SPN and one or more DCs cannot normally be monitored by a single NMS, there is a need in the field of VPN systems to allow end-to-end monitoring and orchestrating of VPN services that span over these multiple domains. There is also a need in VPN systems to enable a single NMS or other monitoring device to discover, visualize, model, provision, monitor, and re-provision resources in an autonomous system spanning multiple domains in order to optimize network services in a unified manner across the entire autonomous system.

BRIEF SUMMARY

Systems and methods are described herein for monitoring and orchestrating a Virtual Private Network (VPN) that includes an autonomous system stitched together from multiple domains. A process, according to one implementation, includes a step of monitoring an autonomous system that spans across multiple domains. Also, the process includes a step of obtaining one or more ingress endpoints associated with Virtual Private Network (VPN) traffic used for conducting one or more VPN services through the autonomous system. The process further includes a step of obtaining one or more egress endpoints associated with the VPN traffic. It should be noted that the one or more ingress endpoints and the one or more egress endpoints are located in the multiple domains. The process also includes using the one or more ingress endpoints and one or more egress endpoints to compute one or more end-to-end VPN routes through the autonomous system.

In some embodiments, the process may be incorporated in a non-transitory computer-readable medium, which may be part of the autonomous system itself or may be part of a control plane operating in parallel with the autonomous system. For example, the control plane may perform the process and may include a Network Management System (NMS), a Software-Defined Networking (SDN) controller, and/or an application having connectivity to network information of the autonomous system. The multiple domains described herein may include a Service Provider Network (SPN) and one or more Data Centers (DCs). The SPN, for example, may be configured to conduct one or more Internet Protocol VPN (IPVPN) services and each of the one or more DCs may be configured to conduct one or more Ethernet VPN (EVPN) services.

According to some embodiments, the process may further include a step of utilizing one or more gateway devices to stitch the domains in order to enable the end-to-end VPN routes. For example, the gateway devices may be configured to operate in two adjacent domains and may be a dedicated Data Center Interconnect (DCI) router configured to stitch VPN traffic flows from the two adjacent domains into a single end to end flow. For computing the end-to-end VPN routes, the process may include the step of enabling the one or more gateway devices to a) perform label stack stitching to find the one or more egress endpoints and b) perform route target stitching to find the one or more ingress endpoints. Each of the one or more gateway devices, for example, may be configured to a) re-originate Ethernet VPN (EVPN) Type 5 routes from leaves of one or more Data center (DC) domains to Internet Protocol VPN (IPVPN) routes in a domain associated with a Service Provider Network (SPN), b) set a next hop to itself in the re-originated IPVPN routes, and c) announce the IPVPN routes to one or more Provider Edge (PE) devices of the SPN or one or more other gateway devices of the SPN connected to another domain. In the reverse direction, essentially the same control plane path will be followed where IPVPN routes from Provider Edge (PE) devices of the SPN are re-originated to Ethernet VPN (EVPN) type 5 routes.

The step of computing the one or more end-to-end VPN routes may include the step of providing visibility of one or more end-to-end VPN services through the autonomous system. The process may further include the step of identifying a set of route targets in each of the multiple domains of the autonomous system. Also, the process may find one or more route targets in each set of route targets that are stitched using a gateway device bordering two adjacent domains and merge the one or more route targets in each set into one group. For example, the set of route targets in each of the multiple domains may be considered as transitive closures. The process may also assign one or more VPN customer names to the group or transitive closure of route targets.

In some embodiments, the autonomous system may be configured to operate in accordance with Multi-Protocol Label Switching (MPLS) technology. Also, the process may further include performing a closed-loop automation procedure. The closed-loop automation procedure may include the steps of 1) discovery and modelling a stitched VPN, 2) provisioning the stitched VPN, and 3) monitoring the stitched VPN. The discovery and modelling step, for example, may include a) discovering a control plane associated with the autonomous system using the Border Gateway Protocol (BGP) and the Interior Gateway Protocol (IGP), b) discovering service configurations, transport configurations, and administrative states by periodically querying configuration information of devices in the autonomous system, and/or c) discovering Layer 2 and Layer 3 VPN services using discovered BGP routes and by periodically querying the configuration information of Provider Edge (PE) devices. The provisioning step, for example, may include a) receiving network administrator input related to one or more of service endpoints, candidates for gateway devices, service path constraints, load balancing requirements, and route targets, b) leveraging the visibility of the entire autonomous system to provision transport paths to optimize end-to-end service path constraints, and/or c) auto-assigning route targets for the VPN service in the autonomous system by i) setting up isolated clouds of IBGP peers, ii) identifying different domains in the AS, and/or iii) keeping track of sets of route targets used in each domain. In response to determining that service path constraints are not met during the monitoring step, the closed-loop automation procedure may further include looping back to re-model and re-provision the stitched VPN. For example, the service path constraints described herein may include one or more of service degradation, a path or link being down or degraded in any domain, a node being down in any domain, and an increased link utilization beyond acceptable limits in any domain.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for modelling and provisioning stitched Virtual Private Network (VPN) services over an autonomous system that includes multiple domains. The multiple domains, for example, may include a Service Provider Network (SPN) and one or more Data Centers (DCs). In some embodiments, a Network Management System (NMS) may be configured to monitor the autonomous system end-to-end and re-provision the autonomous system as needed to improve data traffic flow, optimize routes, avoid node and link issues, etc. In some embodiments, the NMS or other monitoring device may be configured to operate according to a closed-loop automation technique, which may include node discovery of the stitched VPN, modelling, visualizing, provisioning, monitoring, and re-provisioning of the nodes and links throughout the stitched VPN from end to end.

As mentioned above, conventional systems are typically configured to monitor only a single domain at a time. However, by utilizing Data Center Interconnect (DCI) nodes, which may be arranged at the border between one domain and another, the NMS or other monitoring systems may be able to stitch together information and status of nodes, links, routes, etc. By stitching multiple domains together, the embodiments of the present disclosure are configured to monitor and orchestrate routes and multi-domain VPN services. The stitching function may include allowing the DCI nodes to multiplexing a label stack from one domain to a label stack in another domain.

In some cases, one domain (e.g., SPN) may provide Internet Protocol VPN (IPVPN) services and another domain (e.g., DC) may provide Ethernet VPN (EVPN) service. As such, the DCI nodes may stitch route targets information as well as data regarding ingress and egress endpoints. Thus, the DCI nodes can join multiple pieces of transport paths across different network domains to satisfy one unified service path constraint.

Therefore, the embodiments of the present disclosure are configured to model a stitched VPN that provides stitched VPN services over multiple network domains. Also, this stitched VPN can be monitored by a single entity (e.g., NMS), thereby avoiding the need for a network administrator to manually discover and monitor domains separately, as is normally done with conventional systems. Thus, the present embodiments can leverage the end-to-end visibility of the complete network to automatically compute individual transport parts in order to optimize unified constraints and to leverage the visibility into Border Gateway Protocol (BGP) peers of the network in order to identify isolated Interior BGP (IBGP) domains in the networks and to keep track of in-use route targets within them.

Also, the embodiments of the present disclosure are configured to perform a closed-loop automation process for the stitched VPN services to monitor and orchestrate the entire autonomous system across the multiple domains. In some embodiments, the closed-loop automation process may essentially be an integrated system having a combination of NMS and orchestrator functionality. The closed-loop automation process can leverage a model of end-to-end VPN service to automate discovery, provisioning, and monitoring as a whole.

In addition, the present disclosure further includes embodiments that may be implemented in an NMS. Functionality in this respect may include a projection or visualization of the complete end-to-end path for VPN traffic collected anywhere in the SPN or DC (or DCs). Also, the NMS may be configured to group different route targets, which may be used for the same service but flow in different domains, into transitive closures. Using the transitive closure groups, the NMS can then later identify domain-wise route targets to identify different VPN customers from any domain in the autonomous system.

The present disclosure defines embodiments of an NMS, multi-domain service orchestration device, or other suitable monitoring device in a network for monitoring and orchestrating the multi-domain system. The NMS (or other device)

may be configured to discover routing states and collect traffic flow information at specific points in the network and to discover the stitched VPN service spanning multiple DCs and SPN.

The embodiments of the present disclosure can also use route optimization techniques to identify VPN traffic paths and VPN customers. The embodiments can also link VPN traffic to customers for the stitched VPN service spanning SPN and DC domains. Therefore, the present embodiments can overcome the issues with conventional systems that model and monitor domains separately. The embodiments can use the configuration information obtained by the DCI nodes or determined by the NMS to associate DC and SPN domain services together in order to visualize the end-to-end VPN service. The embodiments can then use the end-to-end service model to correlate with other monitoring systems to analyze traffic collected at any point in the network.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Service Provider Network (SPN) and one Data Center (DC)

Figure 1:
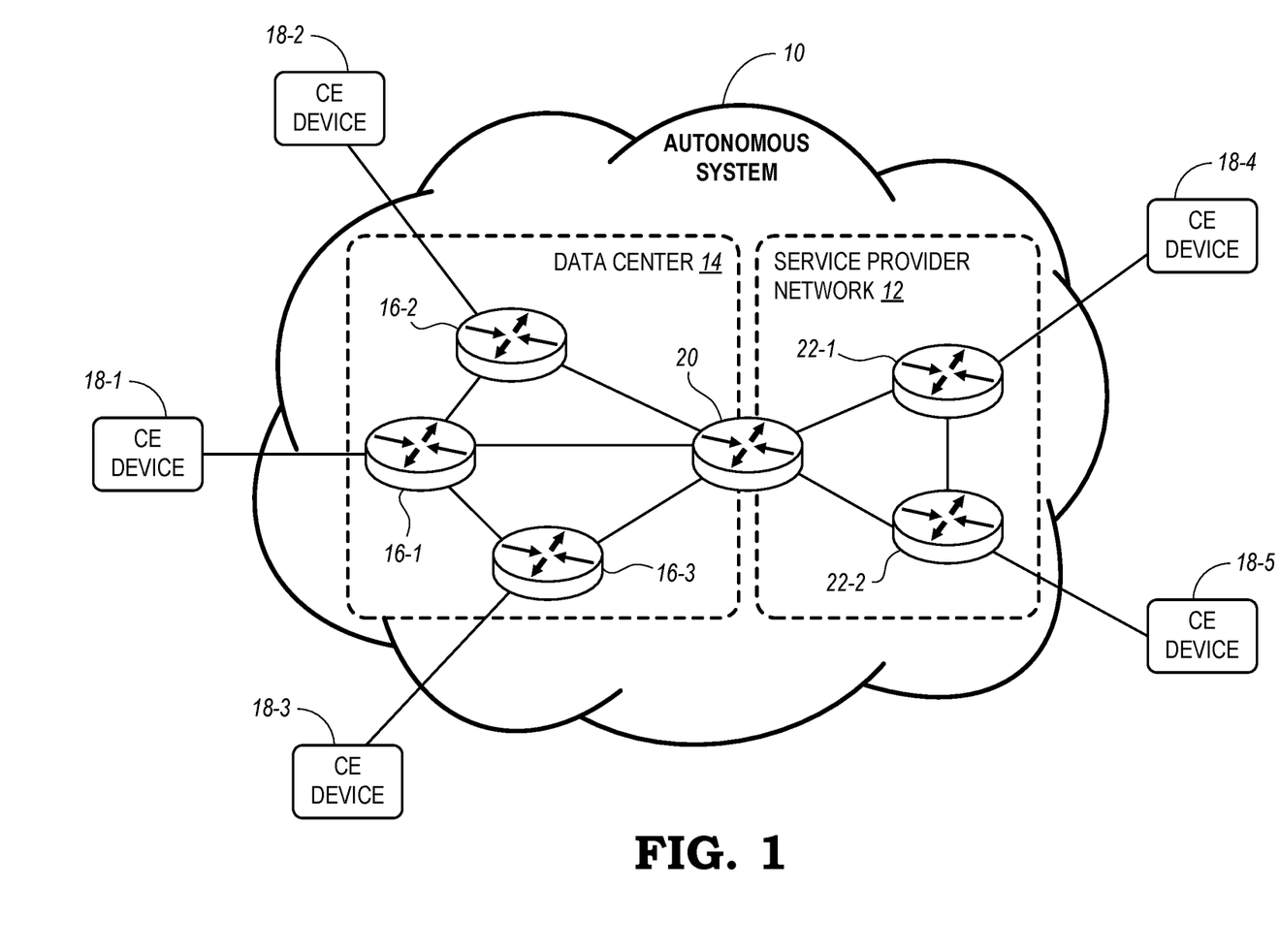
FIG. 1 is a diagram illustrating an autonomous system that includes a Service Provider Network (SPN) and one Data Center (DC) and that is configured for providing Virtual Private Network (VPN) services, according to various embodiments.

FIG. 1 is a diagram illustrating an embodiment of an autonomous system 10 of a communications network. The autonomous system 10 may be configured as an Internet Protocol (IP) and/or Multi-Protocol Label Switching (MPLS) network. As shown, the autonomous system 10 includes a Service Provider Network (SPN) 12 and one Data Center (DC) 14, each shown in a simplified manner for the purpose of discussion. The SPN 12 and DC 14 are configured as two domains that would normally be monitored and orchestrated separately. However, according to the embodiments of the present disclosure, the SPN 12 and DC 14 can be modelled and/or visualized as a whole.

The autonomous system 10 is configured for providing Virtual Private Network (VPN) services. For example, the SPN 12 is configured to enable Internet Protocol VPN (IPVPN) services and the DC 14 is configured to enable Ethernet VPN (EVPN) services. The autonomous system 10 may operate according to the Border Gateway Protocol (BGP). Thus, the SPN 12 may be defined as a BGP IPVPN domain and the DC 14 may be defined as a BGP EVPN domain.

The DC 14, in its simplified form, is shown with leaf devices 16-1, 16-2, 16-3 connected to Customer Edge (CE) devices 18-1, 18-2, 18-3, respectively. The leaf devices 16-1, 16-2, 16-3 are also connected to a Data Center Interconnect (DCI) device 20, which borders both the SPN 12 and DC 14. The SPN 12 includes Provider Edge (PE) devices 22-1, 22-2 connected to the DCI device 20. Also, the PE devices 22-1, 22-2 are connected to CE devices 18-4, 18-5, respectively. In this arrangement, the CE devices 18-1, 18-2, 18-3 may communicate with CE devices 18-4, 18-5 via the DC 14 and SPN 12 via various routes. The devices 16, 18, 20, 22, 22 may be referred to as nodes, routers, switches, or other suitable types of network elements.

A Network Management System (NMS), as described in more detail below with respect to FIG. 5, or other monitoring device may be used to obtain information regarding the status and operating conditions of the leaf devices 16, DCI device 20, and PE devices 22, as well as the links interconnecting these devices. From this information, the NMS can monitor and orchestrate the autonomous system 10.

Hence, the NMS can gain visibility into the autonomous system 10 (or IP/MPLS network) by establishing peerings with a small set of IP devices and/or by periodically querying the configurations of the devices 16, 20, 22 using any suitable access mechanisms (e.g., Command Line Interface (CLI), Netconf, YANG, etc.). For example, the NMS can discover a control plane associated with the network configuration of the autonomous system 10. This discovery may involve dynamically learning BGP and Interior Gateway Protocol (IGP) and may also involve MPLS service configurations, transport configurations, operational states, etc. In some embodiments, the NMS may model Layer 2 (L2) VPN services and/or Layer 3 (L3) VPN services present on the autonomous system 10 using learned BGP routes of the service address family and the configuration details by periodically querying the device 16, 20 and 22. The same network administrator using the NMS may be able to control both the SPN 12 and DC 14 since they both part of the same autonomous system 10.

The two domains (i.e., SPN 12 and DC 14) are able to communicate using the DCI device 20 and/or one or more other types of dedicated routers. The leaf devices 16 are configured as service endpoints in the DC 14, which may include a leaf-spine design. The PE devices 22 are configured as service endpoints in the SPN 12.

In operation, according to one example, the CE device 18-1 announces (or advertises) connected IP routes to the leaf device 16-1. The leaf device 16-1 announces these routes as BGP EVPN Type 5 routes (or IP prefix routes) to the DCI device 20. The DCI device 20 re-originate these EVPN Type 5 routes as IPVPN routes and sets the next hop to itself in the re-originated IPVPN routes. Next, the DCI device 20 announces these IPVPN routes to the PE devices 22-1, 22-2. Then, the PE devices 22-1, 22-2 announce these routes to the CE devices 18-4 and 18-5 as IP routes.

The same control plane path may also be followed in case where one of the CE devices 18-4, 18-5 transmits signals to the CE devices 18-1, 18-2, 18-3. One difference, however, is that, in the reverse direction, the DCI device 20 re-originate IPVPN routes as EVPN Type 5 routes.

Service Provider Network (SPN) and multiple Data Centers (DCs)

Figure 2:
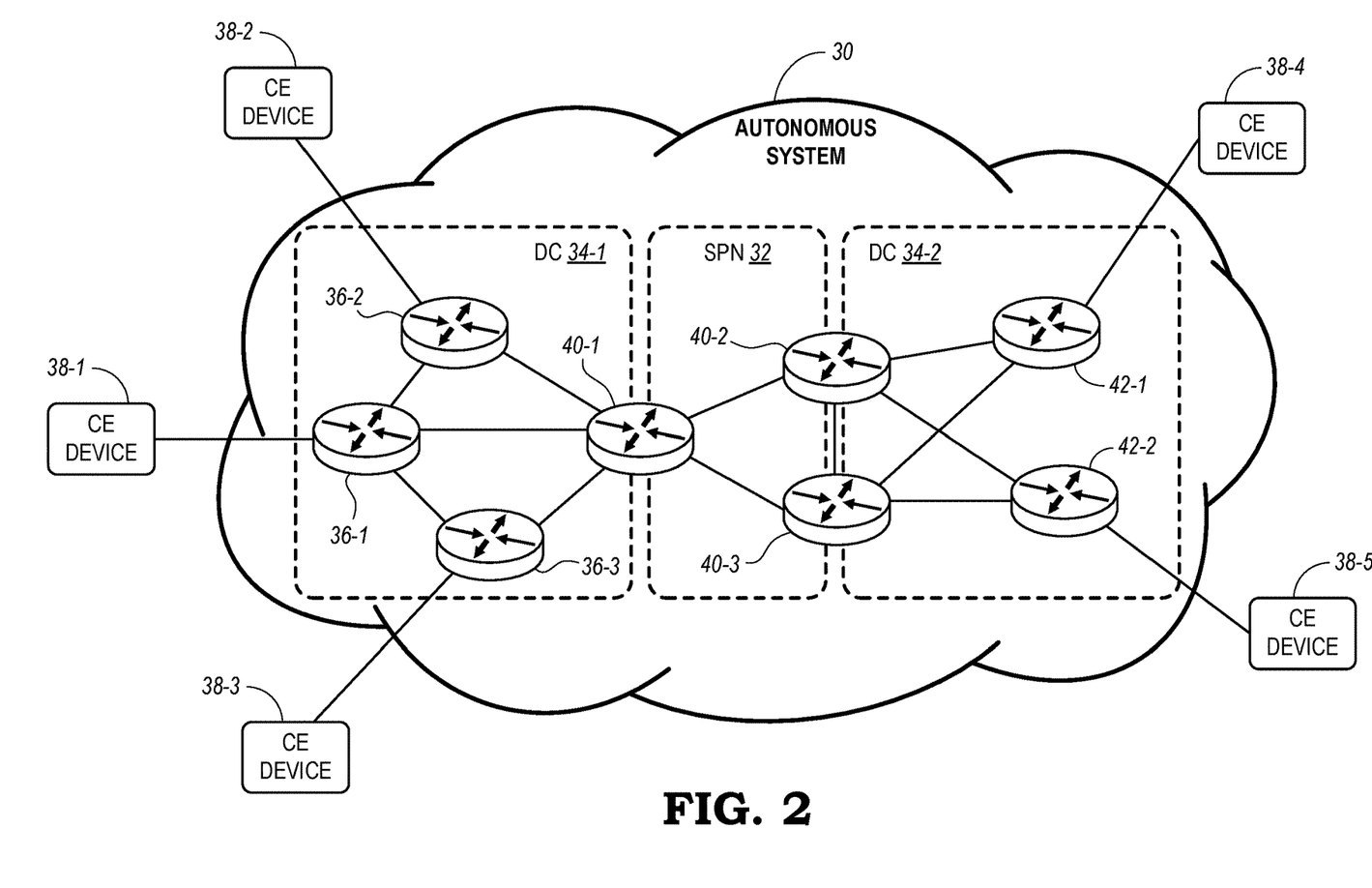
FIG. 2 is a diagram illustrating an autonomous system that includes an SPN and multiple DCs, according to various embodiments.

FIG. 2 is a diagram illustrating an embodiment of an autonomous system 30. The autonomous system 30 of FIG. 2 is similar to the autonomous system 10 of FIG. 1 except that the autonomous system 30 includes an SPN 32 and multiple DCs 34-1, 34-2. Although only two DCs 34 are shown in FIG. 2, it should be noted that the autonomous system 30 may include any number of DCs.

In the illustrated embodiment, the autonomous system 30 is configured whereby the first DC 34-1 includes leaf devices 36-1, 36-2, 36-3 connected to CE devices 38-1, 38-2, 38-3. Also, the leaf devices 36-1, 36-2, 36-3 are also connected to a first DCI device 40-1, which borders the first DC 34-1 and the SPN 32. The first DCI device 40-1 is connected to second and third DCI devices 40-2, 40-3, which border the SPN 32 and the second DC 34-2. The second and third DCI devices 40-2, 40-3 are connected to leaf devices 42-1, 42-2. The first leaf device 42-1 of the second DC 34-2 is connected to CE device 38-4 and the second leaf device 42-2 of the second DC 34-2 is connected to CE device 38-5.

In operation, according to one example, the CE device 38-1 may announce (or advertise) connected IP routes to the leaf device 36-1. The leaf device 36-1 announces these routes as BGP EVPN Type 5 routes to the first DCI device 40-1. The first DCI device 40-1 re-originate these EVPN Type 5 routes as IPVPN routes and sets the next hop to itself in the re-originated IPVPN routes. The first DCI device 40-1 announces these IPVPN routes to the second and third DCI devices 40-2, 40-3. The second and third DCI devices 40-2, 40-3 are configured to re-originate these IPVPN routes as EVPN Type 5 routes and each is configured to set the next hop to itself in the re-originated EVPN Type 5 routes. Next, the second and third DCI device 40-2, 40-3 announce these EVPN Type 5 routes to the first and second leaf devices 42-1, 42-2 of the second DC 34-2. The first and second leaf devices 42-1, 42-2 of the second DC 34-2 then announce these routes to the CE devices 38-4, 38-5, respectively, as IP routes.

In the reverse direction, essentially the same control plane path will be followed in case where signals are communicated from the CE devices 38-4, 38-5 to the CE devices 38-1, 38-2, 38-3. However, one exception is that the second and third DCI devices 40-2, 40-3 re-originate EVPN Type 5 routes as IPVPN routes and the first DCI device 40-1 re-originate the IPVPN routes as EVPN Type 5 routes.

I. Closed Loop Automation

Figure 3:
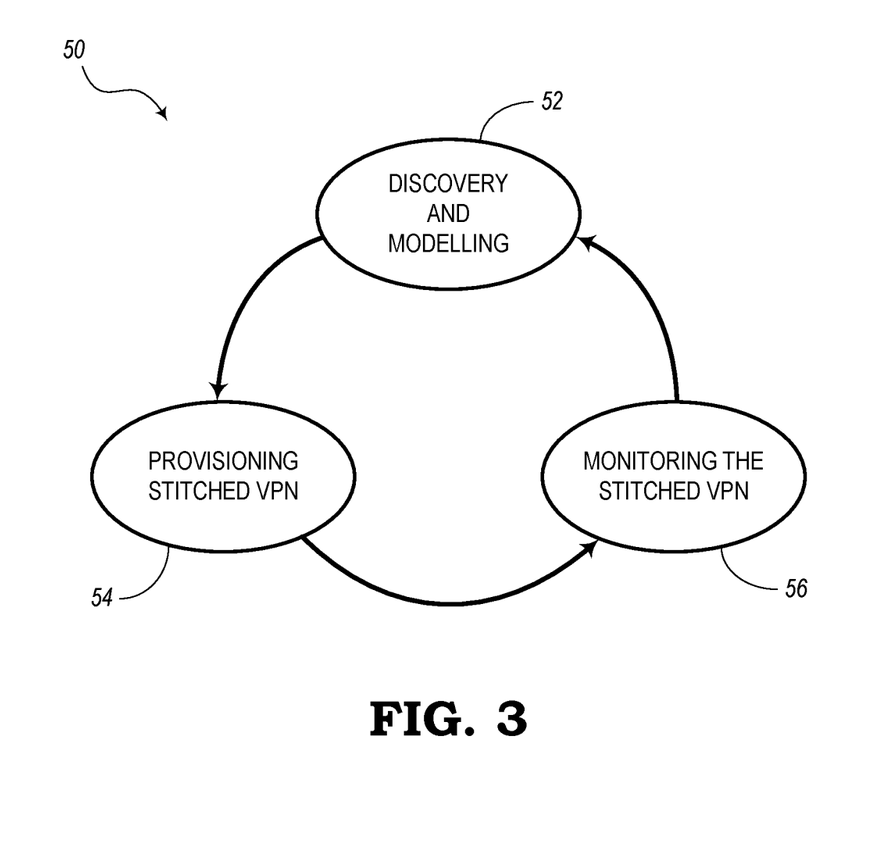
FIG. 3 is a diagram illustrating a closed-loop automation procedure, according to various embodiments.

FIG. 3 is a diagram illustrating an embodiment of a closed-loop automation procedure 50. In the illustrated embodiment, the closed-loop automation procedure 50 includes a discovery and modelling process 52, a provisioning process 54, and a monitoring process 56. The flow path of the closed-loop automation procedure 50 includes starting with the discovery and modelling process 52 for discovering domains associated with a common VPN service and network equipment used in each domain. The discovery and modelling process 52 may discover the topology of the entire autonomous system (e.g., autonomous system 10, 30), which may include a number of network devices (e.g., nodes, routers, etc.) and links interconnecting the network devices.

After discovery and modelling, the closed-loop automation procedure 50 includes the provisioning process 54, which is configured to perform provisioning, setup, configuration setting, etc. for the network devices and links and for creating and defining end-to-end routes throughout the entire autonomous system. Then, the closed-loop automation procedure 50 includes the monitoring process 56, which includes receiving configuration settings, status information of nodes and routers, fault conditions, data traffic information, etc. If data traffic is not optimized in an efficient manner, the monitoring process 56 may detect issues that may be resolved to avoid faulty routes, minimize congestion, etc. After monitoring, the closed-loop automation procedure 50 may include re-discovering, re-modelling, and re-provisioning the autonomous system as needed for route optimization or other orchestration function.

In some embodiments, the closed-loop automation procedure 50 may include the following phases:
  Phase 1—Discovery and Modelling
  Phase 2—Provisioning of a Stitched VPN for enabling Stitched VPN Services
  Phase 3—Monitoring the Stitched VPN and Stitched VPN Services
  Phase 4—Re-provisioning the Stitched VPN
  Phase 1—Discovery and Modelling The first phase of discovery and modelling (e.g., discovery and modelling process 52) may include discovering an existing IPVPN domain and one or more EVPN domains. This phase may also include indexing and tracking these domains using a suitable identification method. For example, in a brownfield network (i.e., in which domains already exist), the first phase may include discovering and modelling the existing stitched services. This phase may also include a way to identify the association between stitched DC and SPN services.

The autonomous system (e.g., autonomous system 10, 30) may be include monitoring and/or telemetry devices for self-analyzing the status of various nodes and links. The monitoring devices may be configured to discover the control plane of the DC 14, 34-1, 34-2 and the SPN 12, 32 by discovering the dynamic protocol data (e.g., BGP and IGP). The monitoring device can discover the service configuration information, transport configuration information, operational states, and other configuration information by periodically exploring the devices. This may be done by periodically querying the configuration of devices using any suitable access mechanisms (e.g., CLI, Netconf, Simple Network Monitoring Protocol (SNMP), extended Application Programming Interface (eAPI), etc.). Also, the monitoring devices may discover L3VPN/L2VPN services present on the network using the learned BGP routes of the service address family and service configuration details by allowing the monitoring system to to periodically explore the network devices and routes.

As mentioned above, the conventional systems normally do not have the capability to perform these functions. For example, the conventional systems may model the services separated, where EVPN service may be analyzed in the DC and IPVPN service may be analyzed in the SPN. However, the conventional systems are unable to identify these services as one end-to-end stitched VPN service since it does not have visibility of the end-to-end stitched service path. Also, they are unable to find end-to-end service paths for a particular customer prefix.

The embodiments of the present disclosure are configured to overcome these deficiencies in the conventional system. For example, the present embodiments are configured to identify stitched service instances on the DCI device (e.g., DCI device 20, 40-1, 40-2, 40-3). The service instances can be identified by using the configuration data of the network device monitored by the corresponding monitoring devices. This stitched service instance may associate EVPN and IPVPN services on the DCI nodes using BGP route targets. The monitoring system can use this information to visualize end-to-end stitched VPN service path. That is, the EVPN service and IPVPN service together form one VPN service in the model created in the discovery and modelling phase. In some embodiments, the NMS may use this information to find end-to-end service paths for a particular customer prefix. The service path can be found starting from either the SPN or one of the DCs.

Phase 2—Provisioning of a Stitched VPN for enabling Stitched VPN Services

Provisioning (e.g., provisioning 54) may include setting parameters or configuration data of the various network devices to orchestrate routes (e.g., in an optimized manner to reduce latency, avoid congestion, avoid faults, etc.). The NMS or other monitoring and orchestrating systems can provision the stitched IPVPN services between the SPN 12, 32 and the one or more DCs 14, 34.

Various provisioning scenarios of the provisioning phase may include making additions and/or modifications in already existing stitched IPVPN services. The provisioning may also include converting already existing individual services into the stitched IPVPN service. Also, the provisioning may include Day-0 service orchestration, where all the services are provisioned by the system. When no services exist in a new network, all the services may be provisioned as needed by the present systems and methods.

The phase of provisioning the stitched VPN and corresponding services may include identifying a topology-span of the BGP/IPVPN domain and the various BGP/EVPN domains that are part of the same autonomous system. Again, the autonomous system (e.g., autonomous system 10, 30) may operate according to BGP policies. The system may identity the topology-span to track the EVPN and IPVPN domains separately in the service orchestrator. The system may then provision individual transport paths in multiple domains to optimize a single unified constraint (e.g., latency constraint, etc.). Also, the system may include a re-discovery process to model the newly provisioned or updated services.

In some embodiments, a network administrator may be associated with a NMS for providing input as needed and for actively analyzing the status of various systems. For example, some inputs by the network administrator may include the identification of service endpoints in the one or more DCs 14, 34 (e.g., leaf devices 16, 26, 42) and service endpoints in the SPN 12, 32 (e.g., PE devices 22) if the service ends within the SPN, as in the embodiment of FIG. 1. The network administrator can also input information about candidates for the DCI devices 20, 40. These devices or routers may be configured as gateway devices between the SPN and one of the DCs. Additional input from the network administrator may include desired constraints for service paths (e.g., low latency, etc.), load balancing requirements (e.g., active-active, active-standby, etc.) on the DCI devices 40 in the embodiment where multiple DCIs are used. Also, the network administrator may enter route targets for the service in each domain, which, in alternative embodiments, can be automatically assigned or suggested by the system.

To provision, the system may be configured to perform the following steps, which may be variable based on the specific scenario:
   Check feasibility of transport paths fulfilling the desired constraints between service endpoints;
   Select DCI from candidates based on various criteria or select multiple DCI if load balancing is required;
   Configure service instance on service endpoints (e.g., leaf devices, PE devices);
   Configure service instance on the DCI device;
   Configure Traffic Engineered (TE) transport paths in each domain (VPN and EVPN); and
   Configure strategic steering of service traffic onto the transport paths.

Furthermore, the embodiments of the present disclosure are configured to overcome various deficiencies of the conventional systems. Some challenges with computing transport paths over multiple domains is that transport paths in the conventional systems cannot be computed in such a way that the required constraint is optimized for the overall service path. Instead, only transport paths in a single domain can be computed. However, the present disclosure is configured to meet constraints over the entire autonomous system 10, 30. In some cases, the best set of transport paths in individual domains may not be best for overall service path. Again, the present embodiments are able to handle detection of the best paths. That is, the systems and methods of the present disclosure are configured to leverage the visibility of the system into a complete network and then provision the transport path such that the overall end-to-end constraint is optimized.

Regarding the process of assigning route targets for the service, the embodiments of the present disclosure may include using BGP route targets as an identifier to tag BGP routes with the service. The route targets can be used for an IPVPN/EVPN service and in some embodiments may be unique within a BGP domain. Since there can be multiple domains (DCs and SPNs) stitched together for performing the stitched VPN service, for example, the systems of the present disclosure may keep track of the available route targets to be used in each domain. In one example, the same route target can be used within different DCs safely. However, if it is used for different services in the same DC, then there may be network issues. Since all the domains are part of same BGP autonomous system, the conventional systems cannot automatically keep track of route targets used in each domain separately. The present disclosure provides a solution to this issue, as shown with respect to FIG. 4.

Figure 4:
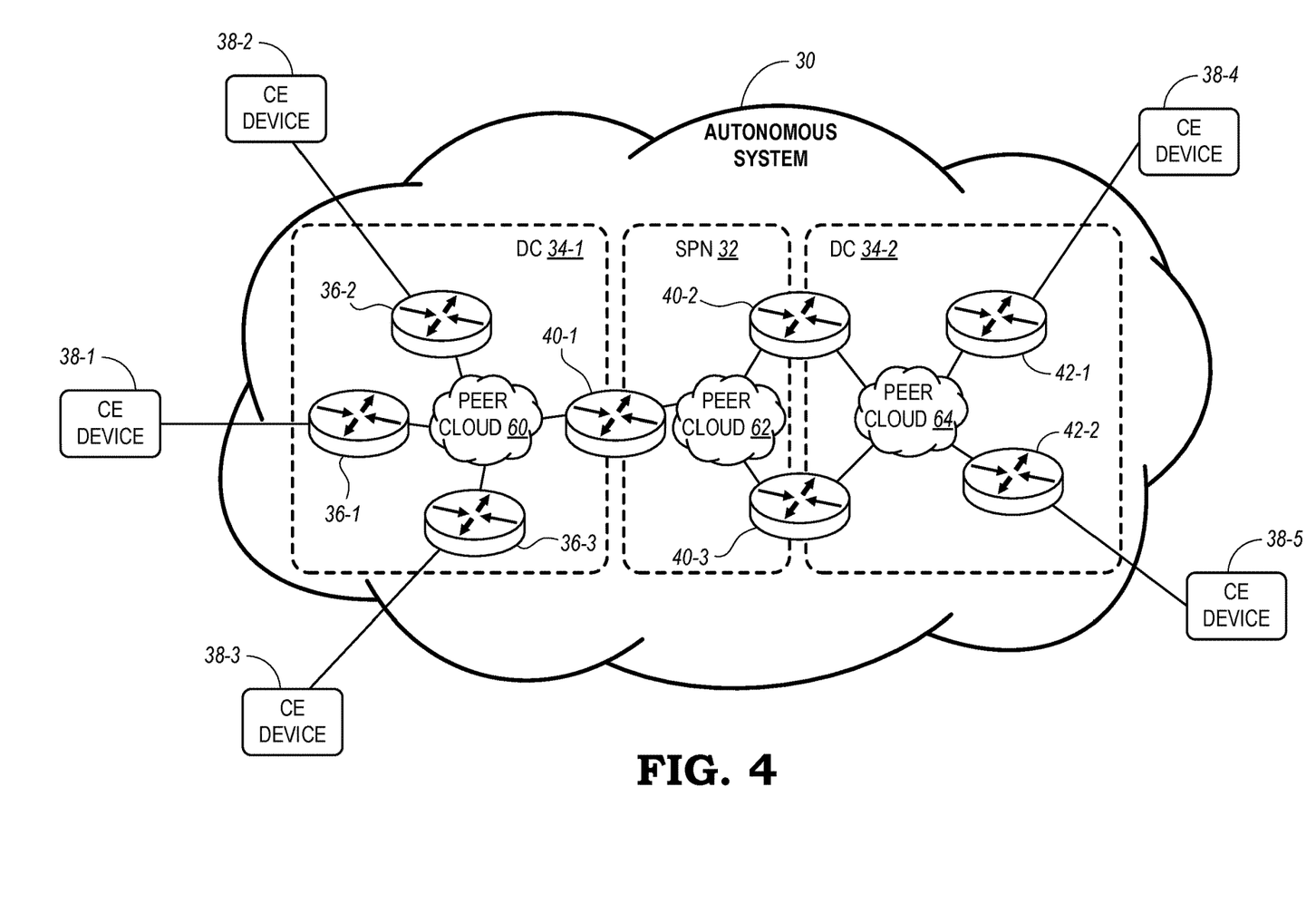
FIG. 4 is a diagram illustrating the autonomous system of FIG. 2 and further illustrating Interior Border Gateway Protocol (IBGP) peer clouds in each domain, according to various embodiments.

FIG. 4 is a diagram illustrating another embodiment of the autonomous system 30 of FIG. 2. Also shown in FIG. 4 are Interior Border Gateway Protocol (IBGP) peer clouds in each domain. For example, the DC 34-1 includes a first IBGP peer cloud 60, the SPN 32 includes a second IBGP peer cloud 62, and the DC 34-2 includes a third IBGP peer cloud 64. The leaf devices 36 and first DCI device 40-1 are connected to the first IBGP peer cloud 60. The first, second, and third DCI devices 40-1, 40-2, 40-3 are connected to the second IBGP peer cloud 62. Also, the second and third DCI devices 40-2, 40-3 and the first and second leaf devices 42-1, 42-2 of the second DC 34-2 are connected to the third IBGP peer cloud 64.

Thus, multiple logical IBGP domains are formed within the autonomous system 30 by setting up isolated clouds of IBGP peerings (e.g., IBGP peer clouds 60, 62, 64), which do not talk with each other. The systems of the present disclosure may include a first step to solve this problem by identifying different IBGP domains within a single BGP autonomous system.

For example, to achieve this, the systems of the present disclosure may be configured to use configured BGP neighbors on the nodes, learned from the explored node configurations. Based on node BGP neighbor details, the system may prepare a graph of BGP neighbors. The disjoint parts of this graph can then be easily identified by the present systems as different domains. The systems of the present disclosure may keep track of route targets used in each domain separately. When the systems suggests route targets for an IBGP domain service, the systems may first identify the IBGP domains of the service based on endpoints involved. After identifying the IBGP domains, the systems may then suggest a route target that is not already used for that IBGP domain. In the case of user provided route targets, the systems may check the uniqueness of those route targets in that domain.

Phase 3—Monitoring the Stitched VPN and Stitched VPN Services

The embodiments of the present disclosure are configured to monitor (e.g., monitoring 56) real time parameters related to the operational state of the end-to-end VPN service in the stitched VPN. Upon a detection of some type of service degradation, the present systems can alert the network administrator of the detected issues. For example, the system can alert if end-to-end multi-domain service path constraints are not being met due to any number of reasons, such as, for example:

- a Traffic Engineered (TE) path detected as being down or degraded in any domain;
- any node or link detected as being down in any domain;
- a detected increase in bandwidth utilization of links in any domain; etc.

The present systems (e.g., NMS) may be configured to monitor the stitched service path for the following issues: a) constraints not being satisfied (e.g., delay, latency, capacity etc.), b) link/Node failures, c) change in service operational state at the endpoints.

Phase 4—Re-provisioning the Stitched VPN

As a result of detecting issues, the systems and methods of the present disclosure may be configured to perform the closed-loop automation procedure 50, as described, for example, in FIG. 3. That is, upon monitoring certain issues, the flow path of the closed-loop automation procedure 50 may loop back to the beginning (e.g., steps 52 and 54) to re-discover, re-model, and re-provision the VPN services. This can be based on the above-described alerts of the end-to-end VPN service. Thus, upon degradation, the model of the VPN services can be re-provisioned, following the provisioning steps mentioned in the present disclosure.

II. Grouping Route Targets and Identifying Customers

According to a second set of additional embodiments with respect to the present disclosure, the systems and methods may be configured to group route targets in a stitched VPN and identify customers from the grouped route targets. For example, the systems and methods may be able to analyze any autonomous system (e.g., autonomous system 10, 30) that is configured for end-to-end VPN services. Again, the analyzed autonomous system may be provisioned to include an SPN (e.g., SPN 12, 32) and one or more DCs (e.g., DC 14, 34-1, 34-2), as mentioned in the present disclosure. In this respect, the systems and methods are configured to provide additional procedures for stitched VPN service, including, for example:

- Computation of end-to-end paths for VPN traffic collected anywhere in DC or SPN;
- Grouping of route targets into transitive closures to identify VPN customers; and
- Assigning VPN customer to traffic collected anywhere in the DC or SPN.

Computation of end-to-end path for VPN traffic collected anywhere in DC or SPN

First, the systems and methods may be configured to identify the source service endpoint (e.g., PE devices 22) for the traffic using the following steps:

Find the egress endpoint and service instance, which may include a Virtual Routing and Forwarding (VRF) strategy (e.g., using a VRF table), routing instances, contexts, or other suitable method. In the examples described herein, although VRF strategies are used, it should be understood that other types of Multi-Protocol Label Switching (MPLS) and VPN techniques may be used. The VRF step may include using the label stack defining the traffic through the stitched VPN.

Get the import route targets (RTs) of the egress VRF.

Find the ingress endpoints that announce BGP routes corresponding to the import RT of the egress VRF and source prefix of the traffic.

For example, VRFs may be used in MPLS systems, such as L3 VPNs, particularly since VRFs may cause each PE device 22 to appear as different routers to the CE devices 18, 38. Customers using the same subnets may be terminated on the same PE devices based on different VRF tables. As such, routing information associated with one VRF for one customer can be separated from routing information associated with another customer. VPN traffic can be tunneled over the SP 12, 32 in the MPLS network. For example, if two different customers have subnets that terminate at the PE device 22-1, the customers can be differentiated at the provider end based on their respective VRFs.

Since VRFs are typically specific to the PE devices 22 in this case, the systems and methods of the present disclosure may use another parameter to distinguish the IPVPN data in the MPLS system. One parameter in this respect, for example, is referred to as the Route Target (RT), not to be confused with the Route Distinguisher (RD). For example, the RT may be used to obtain the correct routing path across an MPLS VPN. The RTs allow the routers to control the ingress and egress of routes among the different VRFs. As described below, the different customers are identified in order that routing paths define connectivity such that RTs may be imported and exported between respective VRFs.

In the context of stitched VPN services, the conventional systems may experience certain problems. For example, there may be problems with:

- Finding egress endpoints across domain. For example, when traffic is collected in the SPN domain and egress is present in the DC domain, or vice versa, there is a problem in finding the egress endpoint. This problem may arise since the egress endpoint may belong to a different domain than the domain of the label stack in the collected traffic.
- Finding ingress endpoints using import RT and traffic source prefix. For example, the ingress and egress endpoints in the multi-domain scenarios usually belong to different domains. Thus, the imported RTs of egress VRF are not found in the ingress domain.

To overcome these issues with the conventional systems, the systems and methods of the present disclosure are configured to perform specific functions to compute the end-to-end paths for VPN traffic. For example, the present embodiments may include:

- Finding egress endpoints across the multiple domain. For example, this may be achieved by stitching the label stacks at the nodes or DCI devices 20, 40 bordering the different domains.
- Finding one or more ingress endpoints using import RT and traffic source prefix. This may include stitching of RTs at DCI devices 20, 40.

Grouping of Route-Targets into Transitive Closures to Identify VPN Customers

In some route optimization scenarios, a system may obtain different sets of Route Targets (RTs) from two different places. For example, RTs may be obtained from BGP routes of the relevant address family and domain and/or may be obtained from service instance configurations (VRFs or EVIs) discovered from the devices 16, 20 and 22. These route optimization systems may then try to correlate the route targets to bin them into groups that belong to the same service.

However, one problem with this type of system is that it can correlate BGP routes and service instance configurations from only one domain. Hence, it cannot identify the whole set of RTs used by complete stitched service spanning across both SPN and DC domains. Again, the systems and methods of the present disclosure are configured to overcome these problems in a stitched VPN providing stitched VPN services. That is, to identify the whole set of RTs for a stitched VPN, the present embodiments can:

identify the RTs for individual domains based on current implementation (e.g., BGP routes and explored configuration from endpoints for that domain);

Identify the common service instance configured for both domains (SPN and DC) on DCI devices 20, 40. This service instance has the configuration for stitching of services (e.g., RTs).

for explored configuration of each service instance on DCI devices, find corresponding groups of RTs from the DC and SPN which are stitched using that DCI service instance, and merge the two groups of RTs together as one group identifying the whole stitched service, also marking each RT with their specific domain after identifying the groups of RTs (e.g., transitive closures) that belong to the same service, each group is assigned a name either automatically or by the user. This helps identify the customer of that VPN service.

Assigning VPN Customers to Traffic Collected Anywhere in the DC or SPN

The conventional systems may find the egress endpoint and service instance (e.g., VRF) using the label stack defining the traffic path. These systems may get the RTs of the egress VRF and find the group of RTs (e.g., transitive closure) that contain egress VRF RTs. These systems may experience problems, such as a) finding egress endpoints across the domain, as mentioned above, and b) grouping RTs into different transitive closures to identify customers of end-to-end VPN service. Again, the systems and methods of the present disclosure are configured to overcome these problems. For example, by using the solutions described above, the present embodiments can avoid the above problems.

Monitoring Device

Figure 5:
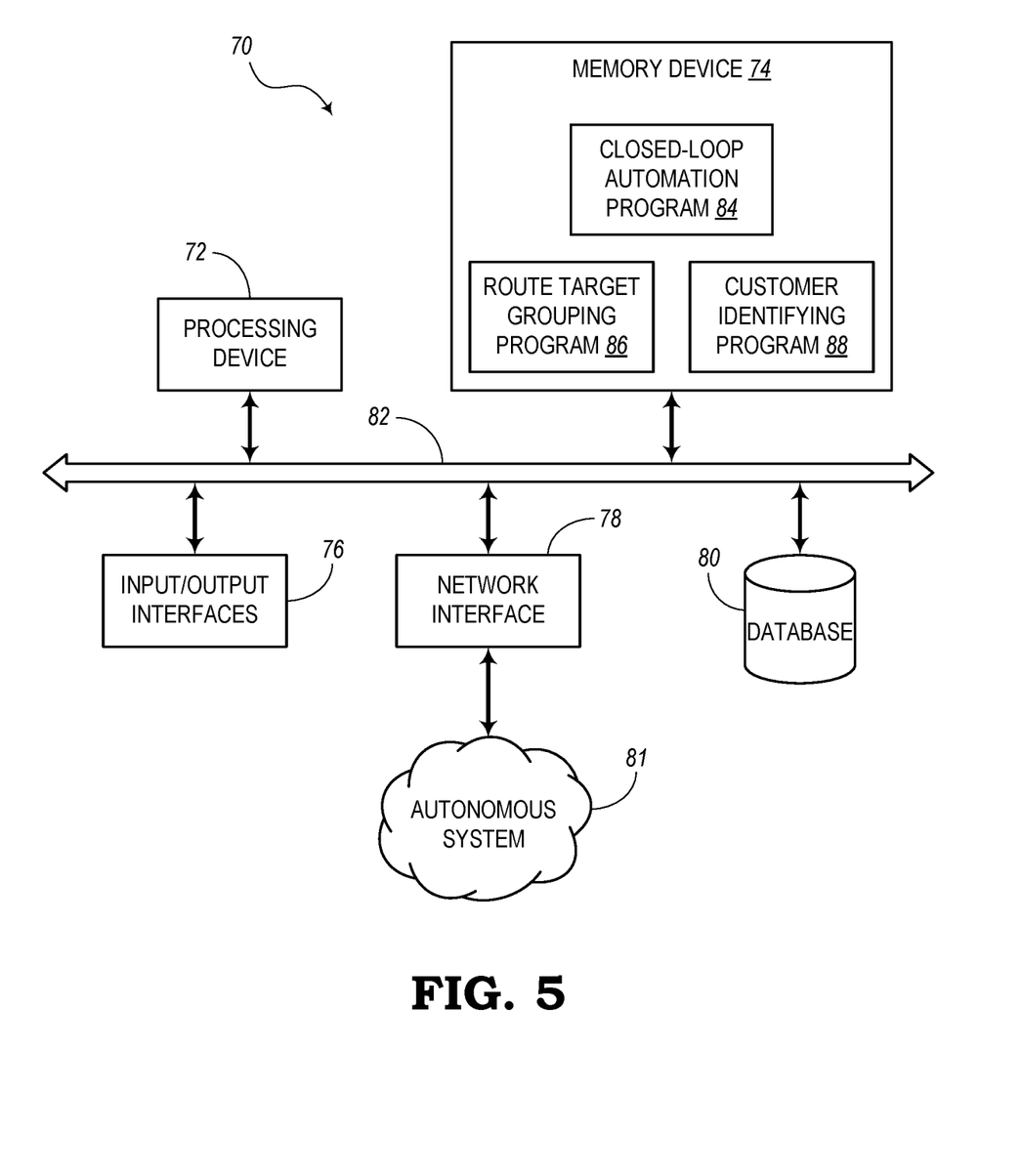
FIG. 5 is a block diagram illustrating a monitoring device, such as a Network Management System (NMS), for monitoring and orchestrating a stitched VPN, according to various embodiments.

FIG. 5 is a block diagram illustrating an embodiment of a monitoring device 70. The monitoring device 70 may be deployed in a control plane associated with an autonomous system (e.g., autonomous system 10, 30) and/or may be deployed within the autonomous system itself. The monitoring device 70 may be a Network Management System (NMS) for monitoring and orchestrating a stitched VPN. In the illustrated embodiment, the monitoring device 70 may be a digital computing device that generally includes a processing device 72, a memory device 74, Input/Output (I/O) interfaces 76, a network interface 78, and a database 80. The network interface 78 may be configured to communicate with an autonomous system 81, such as one including multiple domains, to monitor and control the autonomous system 81.

It should be appreciated that FIG. 5 depicts the monitoring device 70 in a simplified manner, where some embodiments may include additional components and suitably configured processing logic to support known or conventional operating features. The components (i.e., 72, 74, 76, 78, 80) may be communicatively coupled via a local interface 82. The local interface 82 may include, for example, one or more buses or other wired or wireless connections. The local interface 82 may also include controllers, buffers, caches, drivers, repeaters, receivers, among other elements, to enable communication. Further, the local interface 82 may include address, control, and/or data connections to enable appropriate communications among the components 72, 74, 76, 78,80.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

The monitoring device 70 may further includes a closed-loop automation program 84, a route target grouping program 86, and a customer identifying program 88. The programs 84, 86, 88 may be implemented in any suitable combination of software or firmware in the memory device 74 (or other suitable non-transitory computer-readable media) and/or hardware in the processing device 72. The programs 84, 86, 88 may configured with instructions enabling the processing device 72 to perform various functions. For example, the closed-loop automation program 84 may be configured to enable the processing device 72 to perform the closed-loop automation procedure 50 described with respect to FIG. 3. Also, the route target grouping program 86 and customer identifying program 88 may be configured to enable the processing device 72 to perform the actions of grouping RTs and identifying customers as described in the present disclosure.

Monitoring and Orchestrating Process

Figure 6:
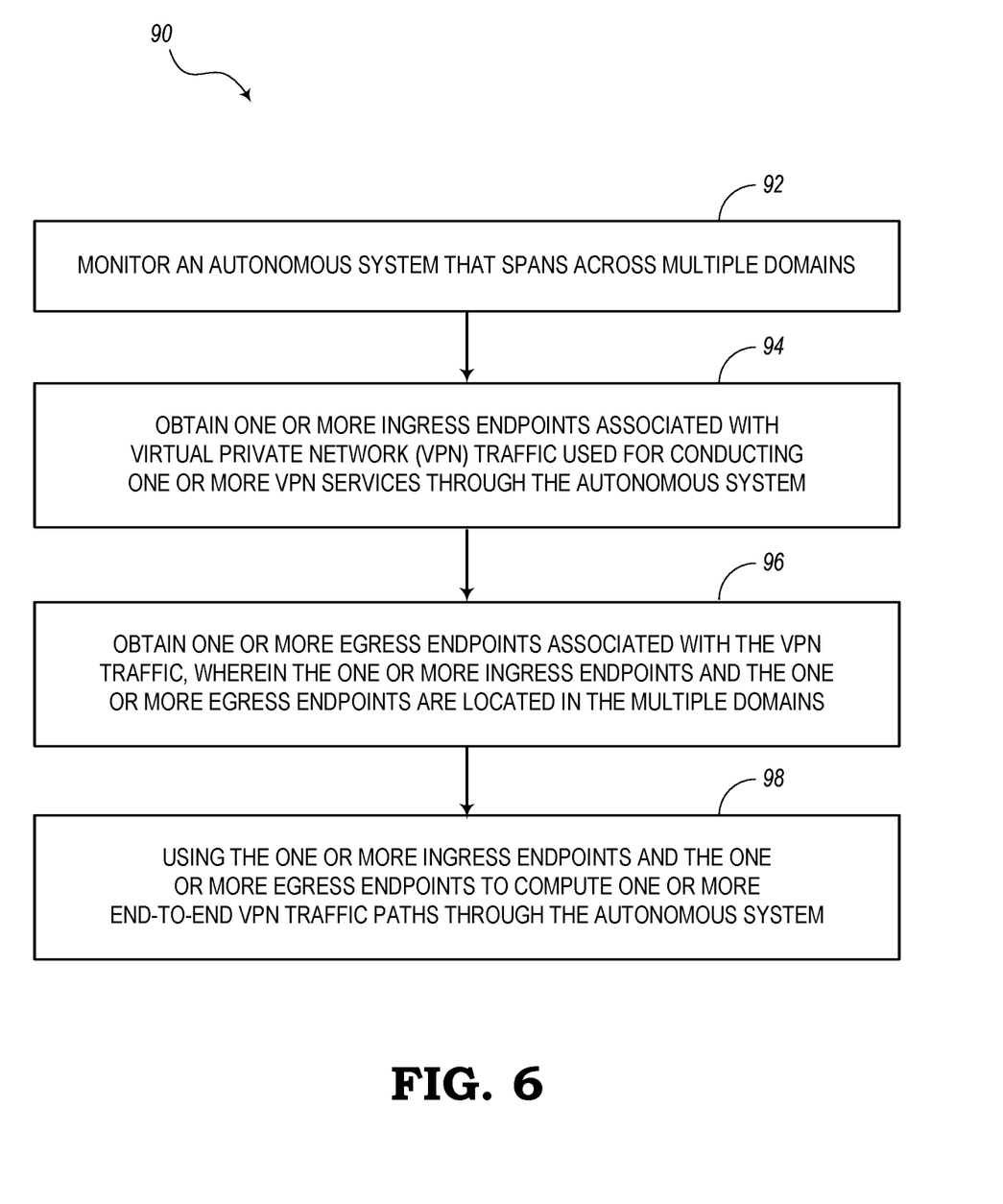
FIG. 6 is a flow diagram illustrating a process for monitoring and orchestrating a stitched VPN, according to various embodiments.

FIG. 6 is a flow diagram illustrating an embodiment of a process 90 for monitoring and orchestrating a stitched VPN. As illustrated, the process 90 includes a step of monitoring an autonomous system that spans across multiple domains, as indicated in block 92. Also, the process 90 includes a step of obtaining one or more ingress endpoints associated with Virtual Private Network (VPN) traffic used for conducting one or more VPN services through the autonomous system, as indicated in block 94. The process 90 further includes a step of obtaining one or more egress endpoints associated with the VPN traffic, as indicated in block 96. It should be noted that the one or more ingress endpoints and the one or more egress endpoints are located in the multiple domains. The process 90 also includes using the one or more ingress endpoints and one or more egress endpoints to compute one or more end-to-end VPN traffic paths through the autonomous system, as indicated in block 98.

In some embodiments, the process 90 may be incorporated in a non-transitory computer-readable medium (e.g., memory device 74), which may be part of the autonomous system itself or may be part of a control plane operating in parallel with the autonomous system. For example, the control plane may perform the process 90 and may include a Network Management System (NMS), a Software-Defined Networking (SDN) controller, and/or an application having connectivity to network information of the autonomous system. The multiple domains described herein may include a Service Provider Network (SPN) and one or more Data Centers (DCs). The SPN, for example, may be configured to conduct one or more Internet Protocol VPN (IPVPN) services and each of the one or more DCs may be configured to conduct one or more Ethernet VPN (EVPN) services.

According to some embodiments, the process 90 may further include a step of utilizing one or more gateway devices to stitch the domains in order to enable the end-to-end VPN routes. For example, the gateway devices may be configured to operate in two adjacent domains and may be a dedicated Data Center Interconnect (DCI) router configured to stitch VPN traffic in each of the two adjacent domains. For computing the end-to-end VPN traffic paths, the process 90 may include the step of enabling the one or more gateway devices to a) perform label stack stitching to find the one or more egress endpoints and b) perform route target stitching to find the one or more ingress endpoints. Each of the one or more gateway devices, for example, may be configured to a) re-originate Ethernet VPN (EVPN) Type 5 routes from leaf devices of one or more Data Center (DC) domains to Internet Protocol VPN (IPVPN) routes in a domain associated with a Service Provider Network (SPN) b) set a next hop to itself in the re-originated IPVPN routes, and c) announce the IPVPN routes to one or more Provider Edge (PE) devices of the SPN or one or more other gateway devices of the SPN connected to another domain.

The step of computing the one or more end-to-end VPN routes may include the step of providing visibility of one or more end-to-end VPN services through the autonomous system. The process 90 may further include the step of identifying a set of route targets in each of the multiple domains of the autonomous system. Also, the process 90 may find one or more route targets in each set of route targets that are stitched using a gateway device bordering two adjacent domains and merge the one or more route targets in each set into one group. For example, the set of route targets in each of the multiple domains may be considered as transitive closures. The process 90 may also assign one or more VPN customer names to the one or more route targets.

In some embodiments, the autonomous system may be configured to operate in accordance with Multi-Protocol Label Switching (MPLS) technology. Also, the process 90 may further include performing a closed-loop automation procedure (e.g., as described with respect to FIG. 3). The closed-loop automation procedure may include the steps of 1) discovery and modelling a stitched VPN, 2) provisioning the stitched VPN, and 3) monitoring the stitched VPN. The discovery and modelling step, for example, may include a) discovering a control plane associated with the autonomous system using the Border Gateway Protocol (BGP) and the Interior Gateway Protocol (IGP), b) discovering service configurations, transport configurations, and operational states by periodically querying configuration information of devices in the autonomous system, and/or c) discovering Layer 2 and Layer 3 VPN services using discovered BGP routes by periodically querying the configuration information of Provider Edge (PE) devices. The provisioning step, for example, may include a) receiving network administrator input related to one or more of service endpoints, candidates for gateway devices, service path constraints, load balancing requirements, and route targets, b) leveraging the visibility of the entire autonomous system to provision transport paths to optimize end-to-end service path constraints, and/or c) auto-assigning the autonomous system by i) setting up isolated clouds of IBGP peers, ii) identifying different domains in the AS, and/or iii) keeping track of sets of route targets used in each domain. In response to determining that service path constraints are not met during the monitoring step, the closed-loop autonomation procedure may further include looping back to re-model and re-provision the stitched VPN. For example, the service path constraints described herein may include one or more of service degradation, a path or link being down or degraded in any domain, a node being down in any domain, and an increased link utilization beyond acceptable limits in any domain.

It may be noted that the VPNs described herein may include a system with multipoint-to-multipoint connections. As such, the systems may be used by companies setting up connections between multiple remote offices. Also, one particular goal of the systems and methods of the present disclosure may involve route optimization through the autonomous system. The systems performing route optimization may be configured as IP/MPLS monitoring tools or systems.

The orchestrators and/or multi-domain orchestrators described herein may be configured to provision EVPN and IPVPN services throughout the autonomous systems. The orchestrators may be open source, multi-vendor software solutions that automate service design. Also, in some embodiments, the orchestrators may be able to delivery end-to-end services across complex multi-vendor physical and virtual domains, eliminate management silos, accelerate service fulfillment, and dramatically simplify operations.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store computer logic having instructions that, when executed, cause a processing device to perform the steps of:
monitoring an autonomous system that spans across multiple domains including a Service Provider Network (SPN) and one or more Data Centers (DCs), wherein the processing device is one of a Network Management System (NMS) and a Software-Defined Networking (SDN) controller;
obtaining one or more ingress endpoints associated with Virtual Private Network (VPN) traffic used for conducting one or more VPN services through the autonomous system;
obtaining one or more egress endpoints associated with the VPN traffic, wherein the one or more ingress endpoints and the one or more egress endpoints are located in the multiple domains;
using the one or more ingress endpoints and one or more egress endpoints to compute one or more end-to-end VPN traffic paths for a stitched VPN service through the autonomous system the stitched VPN service includes one or more Internet Protocol VPN (IPVPN) services in the SPN and one or more Ethernet VPN (EVPN) services in the one or more DCs; and
provisioning the stitched VPN service at the one or more egress endpoints and the one or more ingress endpoints in a unified manner, across the one or more IPVPN services and the one or more EVPN services.

2. The non-transitory computer-readable medium of claim 1, wherein the unified manner includes adjustment of service constraints in the multiple domains to provide an overall service path.

3. The non-transitory computer-readable medium of claim 2, wherein the adjustment of service constraints includes determining the service constraints across the overall service path rather than selecting a best service path in each domain of the multiple domains.

4. The non-transitory computer-readable medium of claim 1, wherein the instructions further cause the processing device to utilize one or more gateway devices to stitch the multiple domains in order to compute the one or more end-to-end VPN paths, and wherein the one or more gateway devices are configured to operate in two adjacent domains.

5. The non-transitory computer-readable medium of claim 4, wherein each of the one or more gateway devices is a dedicated Data Center Interconnect (DCI) router configured to stitch VPN traffic in each of the two adjacent domains.

6. The non-transitory computer-readable medium of claim 4, wherein, for computing the one or more end-to-end VPN traffic paths, the instructions are further configured to cause the processing device to enable the one or more gateway devices to perform label stack stitching to find the one or more egress endpoints and to perform route target stitching to find the one or more ingress endpoints.

7. The non-transitory computer-readable medium of claim 4, wherein each of the one or more gateway devices is configured to:
re-originate EVPN Type 5 routes from leaf devices of the one or more DCs to PVPN routes in a domain associated with the IPVPN,
set a next hop to itself in the re-originated IPVPN routes, and
announce the IPVPN routes to one or more Provider Edge (PE) devices of the SPN or one or more other gateway devices of the SPN connected to another domain.

8. The non-transitory computer-readable medium of claim 1, wherein computing the one or more end-to-end VPN paths includes providing visibility of one or more end-to-end VPN services through the autonomous system.

9. The non-transitory computer-readable medium of claim 1, wherein the instructions further cause the processing device to identify a set of route targets in each of the multiple domains of the autonomous system.

10. The non-transitory computer-readable medium of claim 9, wherein the instructions further cause the processing device to:
find one or more route targets in each set of route targets that are stitched using a gateway device bordering two adjacent domains; and
merge the one or more route targets in each set into one group.

11. The non-transitory computer-readable medium of claim 9, wherein the instructions further cause the processing device to consider the set of route targets in each of the multiple domains as transitive closures.

12. The non-transitory computer-readable medium of claim 11, wherein the instructions further cause the processing device to assign one or more VPN customer names to the set of route targets.

13. The non-transitory computer-readable medium of claim 1, wherein the autonomous system is configured to operate in accordance with Multi-Protocol Label Switching (MPLS) technology.

14. The non-transitory computer-readable medium of claim 1, wherein the instructions further cause the processing device to perform a closed-loop automation procedure having steps that include discovery and modelling a stitched VPN, and monitoring the stitched VPN.

15. The non-transitory computer-readable medium of claim 14, wherein the discovery and modelling step includes one or more of:
discovering a control plane associated with the autonomous system using a Border Gateway Protocol (BGP) and an Interior Gateway Protocol (IGP);
discovering service configurations, transport configurations, and operational states by periodically querying configuration information of devices in the autonomous system; and
discovering Layer 2 and Layer 3 VPN services using discovered BGP routes and by discovered service configuration information devices in the autonomous system.

16. The non-transitory computer-readable medium of claim 14, wherein the provisioning step includes one or more of:
receiving network administrator input related to one or more of service endpoints, candidates for gateway devices, service path constraints, load balancing requirements, and route targets;
leveraging visibility of the autonomous system as a whole to provision transport paths to optimize end-to-end service path constraints; and
auto-assigning the route targets by one of a) modelling isolated clouds of Interior Border Gateway Protocol IBGP) peers, b) identifying different IBGP domains in the autonomous system, and c) keeping track of sets of route targets used in each IBGP domain.

17. The non-transitory computer-readable medium of claim 14, wherein in response to determining that service path constraints are not met during the monitoring step, the instructions are further configured to cause the processing device to loop back to re-model and re-provision the stitched VPN service, and wherein the service path constraints include one or more of service degradation, a path or link being down or degraded in any domain, a node being down in any domain, and an increased link utilization beyond acceptable limits in any domain.

18. A method comprising the steps of:
- monitoring an autonomous system that spans across multiple domains including a Service Provider Network (SPN) and one or more Data Centers (DCs), wherein the method is implemented by one of a Network Management System (NMS) and a Software-Defined Networking (SDN) controller;
- obtaining one or more ingress endpoints associated with Virtual Private Network (VPN) traffic used for conducting one or more VPN services through the autonomous system;
- obtaining one or more egress endpoints associated with the VPN traffic, wherein the one or more ingress endpoints and the one or more egress endpoints are located in the multiple domains;
- using the one or more ingress endpoints and one or more egress endpoints t compute one or more end-to-end VPN traffic paths for a stitched VPN service through the autonomous system, the stitched VPN service includes one or more Internet Protocol VPN (IPVPN) services in the SPN and one or more Ethernet VPN (EVPN) service in the one or more DCs; and
- provisioning the stitched VPN service at the one or more egress endpoints and the one or more ingress endpoints in a unified manner, across the one or more IPVPN services and the one or more EVPN services.

19. A system comprising:
- a processing device, and
- a memory device configured to store a computer program having instructions that, when executed, enable the processing device to
  - monitor an autonomous system that spans across multiple domains including a Service Provider Network (SPN) and one or more Data Centers (DCs), wherein the processing device is one of a Network Management System (NMS) and a Software-Defined Networking (SDN) controller;
  - obtain one or more ingress endpoints associated with Virtual Private Network (VPN) traffic used for conducting one or more VPN services through the autonomous system;
  - obtain one or more egress endpoints associated with the VPN traffic, wherein the one or more ingress endpoints and the one or more egress endpoints are located in the multiple domains;
  - use the one or more ingress endpoints and one or more egress endpoints to compute one or more end-to-end VPN traffic paths for a stitched VPN service through the autonomous system, the stitched VPN service includes one or more Internet Protocol VPN (IP-VPN) services in the SPN and one or more Ethernet VPN (EVPN) service in the one or more DCs; and
  - provision the stitched VPN service at the one or more egress endpoints and the one or more ingress endpoints in a unified manner, across the one or more IPVPN services and the one or more EVPN services.

\* \* \* \* \*